United States Patent
Hwang et al.

(10) Patent No.: US 10,084,162 B2
(45) Date of Patent: Sep. 25, 2018

(54) POUCH CASE FOR SECONDARY BATTERY AND POUCH TYPE SECONDARY BATTERY INCLUDING THE SAME

(71) Applicant: LG CHEM, LTD., Seoul (KR)

(72) Inventors: Soo Ji Hwang, Daejeon (KR); Sang Hun Kim, Daejeon (KR); Won Pill Hwang, Daejeon (KR); Sang Sok Jung, Daejeon (KR); Hyung Kyun Yu, Daejeon (KR)

(73) Assignee: LG CHEM, LTD., Seoul (KR)

(*) Notice: Subject to any disclaimer, the term of this patent is extended or adjusted under 35 U.S.C. 154(b) by 370 days.

(21) Appl. No.: 14/923,488

(22) Filed: Oct. 27, 2015

(65) Prior Publication Data
US 2016/0133883 A1 May 12, 2016

(30) Foreign Application Priority Data
Nov. 6, 2014 (KR) .................. 10-2014-0153658

(51) Int. Cl.
*H01M 2/02* (2006.01)
*H01M 10/0525* (2010.01)
(Continued)

(52) U.S. Cl.
CPC ....... *H01M 2/0292* (2013.01); *H01M 2/0275* (2013.01); *B32B 5/20* (2013.01);
(Continued)

(58) Field of Classification Search
CPC .................. H01M 2/0292; H01M 2/0275
See application file for complete search history.

(56) References Cited

U.S. PATENT DOCUMENTS

2012/0037034 A1* 2/2012 Barancyk ............... C08G 18/10
106/18.19
2014/0242333 A1 8/2014 Oono et al.

FOREIGN PATENT DOCUMENTS

JP 2004-47246 A 2/2004
JP 2009-129588 A 6/2009
(Continued)

*Primary Examiner* — Ula C Ruddock
*Assistant Examiner* — Frank A Chernow
(74) *Attorney, Agent, or Firm* — Birch, Stewart, Kolasch & Birch, LLP

(57) ABSTRACT

A pouch case of the present disclosure includes an inner resin layer, a metallic layer, and an outer resin layer, wherein the resin layer(s) include(s) a foaming activator containing an isocyanate-based compound and a polyol compound. Accordingly, since the pouch case includes the inner resin layer and/or the outer resin layer including the foaming activator, when moisture or the like is permeated thereto due to an external factor, a protective layer including urethane-based foam is formed in the outer resin layer or between the inner resin layer and an electrode assembly in a short time, so that the pouch case and the electrode assembly may be protected, moisture which is permeable into the electrode assembly may be blocked, and separator cracking also may be prevented. Accordingly, explosion which may be caused by moisture permeation, separator cracking, or a short circuit by contact between the pouch case and the electrode assembly, or the like, may be prevented, and stability of a pouch type secondary battery may thus be ensured.

19 Claims, 6 Drawing Sheets

(51) Int. Cl.
    *B32B 5/20*     (2006.01)
    *B32B 7/12*     (2006.01)
    *B32B 15/04*    (2006.01)
    *B32B 15/082*   (2006.01)
    *B32B 15/085*   (2006.01)
    *B32B 15/18*    (2006.01)
    *B32B 15/20*    (2006.01)
    *B32B 27/30*    (2006.01)
    *B32B 27/32*    (2006.01)
    *B32B 27/34*    (2006.01)
    *B32B 27/36*    (2006.01)

(52) U.S. Cl.
    CPC ............... *B32B 7/12* (2013.01); *B32B 15/046* (2013.01); *B32B 15/082* (2013.01); *B32B 15/085* (2013.01); *B32B 15/18* (2013.01); *B32B 15/20* (2013.01); *B32B 27/308* (2013.01); *B32B 27/32* (2013.01); *B32B 27/34* (2013.01); *B32B 27/36* (2013.01); *B32B 2262/10* (2013.01); *B32B 2264/00* (2013.01); *B32B 2264/12* (2013.01); *B32B 2266/0214* (2013.01); *B32B 2266/0264* (2013.01); *B32B 2266/0278* (2013.01); *B32B 2270/00* (2013.01); *B32B 2307/306* (2013.01); *B32B 2307/51* (2013.01); *B32B 2307/558* (2013.01); *B32B 2307/581* (2013.01); *B32B 2307/714* (2013.01); *B32B 2307/7265* (2013.01); *B32B 2307/732* (2013.01); *B32B 2439/46* (2013.01); *B32B 2457/10* (2013.01); *B32B 2571/00* (2013.01); *H01M 10/0525* (2013.01)

(56) References Cited

FOREIGN PATENT DOCUMENTS

| | | |
|---|---|---|
| JP | 2014-157798 A | 8/2014 |
| KR | 10-2009-0020888 A | 2/2009 |
| KR | 10-1025415 B1 | 3/2011 |
| KR | 10-2012-0058676 A | 6/2012 |
| WO | WO 2013/069698 A1 | 5/2013 |

\* cited by examiner

POUCH CASE FOR SECONDARY BATTERY AND POUCH TYPE SECONDARY BATTERY INCLUDING THE SAME

CROSS-REFERENCE TO RELATED APPLICATIONS

This application claims the priority of Korean Patent Application No. 10-2014-0153658 filed on Nov. 6, 2014 in the Korean Intellectual Property Office, the disclosure of which is incorporated herein by reference.

BACKGROUND OF THE INVENTION

Field of the Invention

The present disclosure relates to a pouch case for a secondary battery and a pouch type secondary battery including the same, and particularly in a pouch case including an inner resin layer, a metallic layer, and an outer resin layer for enhanced stability, to a pouch case for a secondary battery and a pouch type secondary battery including the same, wherein the inner resin layer and/or the outer resin layer include(s) a foaming activator capable of forming urethane-based foam.

Description of the Related Art

Technological developments and increased demands for mobile devices have led to a rapid increase in demands for secondary batteries as energy sources. Accordingly, researches for secondary batteries capable of meeting a variety of needs are emerging.

There are high demands for a prismatic type lithium secondary battery and a pouch type lithium secondary battery in terms of shape, which have a small thickness and are thus applicable to, for example, cell phones; and a lithium cobalt polymer secondary battery in terms of material, which has high energy density, discharge voltage, and stability.

The prismatic type lithium secondary battery is advantageous in protecting an electrode assembly against external impact and subjected to an easy injection process, but has a difficulty in reducing volume due to a fixed shape. Therefore, electric devices which use the prismatic type lithium secondary battery as a power source have a shortcoming in terms of a restricted design. Moreover, in terms of stability, the prismatic type lithium secondary battery has shortcomings in that gas or liquid is not smoothly vented and the risk of explosion thus increases due to accumulation of internal heat and gas, and ineffective release of internal heat results in cell degradation due to overheat in a short period of time.

The pouch type lithium secondary battery has advantages in that the pouch type lithium secondary battery is suitable for manufacturing a thin cell due to no restriction on its shape and size; it is easy to assemble the pouch type lithium secondary battery through heat fusion; and the pouch type lithium secondary battery has high stability due to easy vent of gas or liquid under the condition of abnormal behaviors. However, the pouch type secondary battery uses a thin soft laminated sheet (pouch) as a case thereof unlike the prismatic type, and thus has shortcomings in terms of low physical and mechanical strength, low sealing reliability, and low stability against external impact and the like.

Particularly, when large current flows into the pouch type secondary battery in a short time by local crush such as high temperature exposure, overcharge, an external short circuit, impurities in electrodes, and nail penetration, the electrode coated with an active material serves as a heat source and generates heat which thus rapidly increases temperature of the battery, so that reactions between an electrolytic solution and the electrode are accelerated and ignition of the battery is thus induced. In addition, an increase in internal pressure of the battery due to a gas generated by the reaction between the electrolytic solution and the electrode results in problems of swelling and explosion of the secondary battery. Such a risk of explosion may be the most critical drawback of lithium secondary batteries because the risk of explosion leads to a serious problem in stability.

Thus, an essential consideration in developing a pouch type secondary battery is to ensure its stability.

Using a pouch case having a high strength for stability ensures stability against external impact, but has a shortcoming in that it is difficult to form such a pouch case. In order to remedy this shortcoming, a method for improving the strength of a battery by using a soft pouch case and further forming a separate reinforcement layer on the surface thereof is suggested. However, in such a case, a separate reinforcement layer should be additionally provided, so that the size, volume, and manufacturing costs of the battery disadvantageously increase.

SUMMARY OF THE INVENTION

The present disclosure provides a pouch case for a secondary battery, which prevents the risk such as battery explosion caused by, upon a crack or rupture of a pouch case by an external factor, moisture permeation, separator cracking, or a short circuit by contact between a pouch case and an electrode assembly, and thus ensures stability.

A pouch case according to an embodiment of the present disclosure includes an inner resin layer, a metallic layer, and an outer resin layer, wherein at least one resin layer of the inner resin layer and the outer resin layer includes a foaming activator, wherein the foaming activator includes an isocyanate-based compound and a polyol compound.

The particle diameter of the foaming activator included in the inner resin layer may be 50% or less of the thickness of the inner resin layer, and the particle diameter of the foaming activator included in the outer resin layer may be 50% or less of the thickness of the outer resin layer.

The content of the foaming activator included in the inner resin layer may be 30 vol % or less of the total volume of the inner resin layer, and the content of the foaming activator included in the outer resin layer may be 30 vol % or less of the total volume of the outer resin layer.

The isocyanate-based compound may include any one selected from the group consisting of benzylisocyanate, phenylisocyanate, isoprene diisocyanate (IPDI), methylene diphenyl diisocyanate (MDI), toluene diisocyanate (TDI), and a combination thereof.

The polyol-based compound may be at least any one selected from the group consisting of polyester polyol compounds and polyether polyol compounds.

The polyether polyol-based compound may include polytetramethylene ether glycol (PTMG).

In the pouch case, a protective layer including urethane-based foam may be formed, on an outer surface of the inner resin layer, by a urethane-based foaming reaction between a foaming activator including the isocyanate-based compound and the polyol compound, and any one foaming agent selected from the group consisting of water, carbon dioxide, and nitrogen, which are caused by an external factor, and a combination thereof.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Exemplary embodiments of the present disclosure will now be described in detail with reference to the accompanying drawings. Terms or words used in this specification and claims should not be restrictively interpreted as ordinary or dictionary-based meanings, but should be interpreted as meanings and concepts conforming to the inventive concept on the basis of the principle that an inventor can properly define the concept of terms to explain his or her own invention in the best ways.

Figure 1:
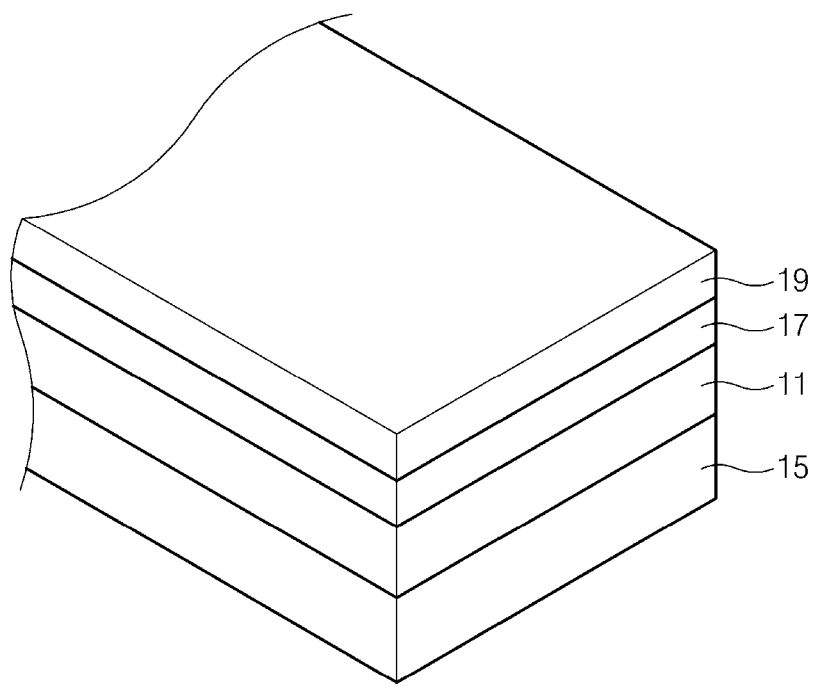
FIG. 1 is a perspective view schematically illustrating a structure of a conventional pouch case having conventional layers of inner resin layer/metallic layer/outer resin layer.

As illustrated in FIG. 1, a conventional pouch type case includes an inner resin layer 11 acting as a sealer, a metallic layer 17 which acts as a barrier layer against moisture and oxygen while maintaining mechanical strength, and an outer resin layer 19 acting as a substrate protecting layer, and an electrode assembly is disposed on one surface of the inner resin layer with the opposite surface being in contact with the metallic layer.

In general, the inner resin layer includes casted polypropylene (CPP), the metallic layer includes an aluminum layer, and the outer resin layer includes a multi-layered structure in which a polyethylene terephthalate (PET) layer and a nylon layer are stacked.

In this case, the casted polypropylene layer as the inner resin layer has disadvantages in that cracks may be generated during a heat fusion process for sealing or the layer is easily ruptured by impact, which is a cause of moisture permeation into a pouch type secondary battery and thus leads to battery explosion and the like. Consequently, this leads to stability degradation of the pouch type secondary battery.

To solve the above-described problems, a pouch case for a secondary battery, according to an embodiment of the present disclosure, includes an inner resin layer, a metallic layer, and an outer resin layer, wherein the inner resin layer and/or the outer resin layer include(s) a foaming activator containing an isocyanate-based compound and a polyol compound.

Furthermore, a pouch type secondary battery according to another embodiment of the present disclosure includes an electrode assembly including a positive electrode, a negative electrode, a separator, and an electrolyte; and the pouch case receiving the electrode assembly.

Hereinafter, the present disclosure will be described in more detail with reference to the accompanying drawings.

First, a pouch case for a secondary battery, according to an embodiment of the present disclosure, may include a foaming activator in an inner resin layer and/or an outer resin layer.

Figure 2:
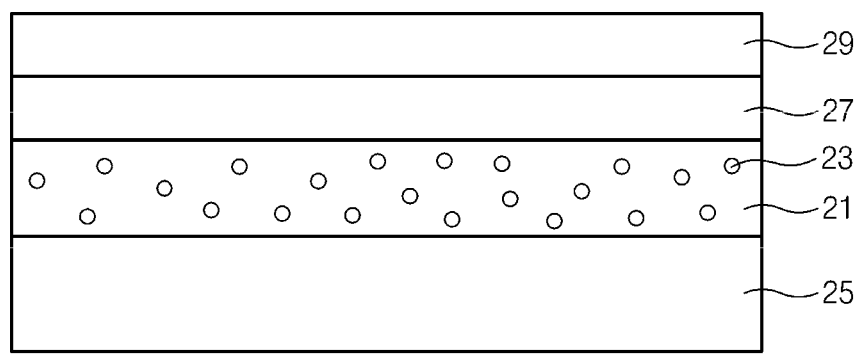
FIG. 2 is a sectional view schematically illustrating a structure of a pouch case having layers of inner resin layer/metallic layer/outer resin layer wherein the inner resin layer includes a foaming activator according to an embodiment of the present disclosure.

FIG. 2 illustrates an electrode assembly 25 and a pouch case having an inner resin layer 21 and an outer resin layer 29 which cover a surface of the electrode assembly 25 wherein the inner resin layer 21 includes foaming activators 23, in which only one surface is illustrated, but the pouch case may cover both surfaces of the electrode assembly.

As illustrated in FIG. 2, the pouch case of the present disclosure may be configured in such a way that the inner resin layer 21 is disposed inside the pouch, where the inner resin layer 21 is in contact with the electrode assembly 25, particulates of foaming activator 23 are homogeneously dispersed in the inner resin layer 21, and a metallic layer 27 is stacked on one surface of the inner resin layer 21 with the opposite surface being in contact with the electrode assembly 25. Furthermore, an outer resin layer 29 which is the outermost member of the pouch case may be stacked on one surface of the metallic layer 27 with the opposite surface being in contact with the inner resin layer 21, and particulates of foaming activator 23 may be homogeneously dispersed even in the outer resin layer 29.

Examples of the foaming activator may include, without limitation, any compound which reacts with a foaming agent such as water, carbon dioxide, or nitrogen to induce a resin reaction and generate urethane-based foam. For example, an isocyanate-based compound and a polyol-based compound may be used as the foaming activator.

The isocyanate-based compound may be generally expressed as R—N=N=O, where R may be hydrocarbon, and the hydrocarbon may be straight-chain or branched, linear or cyclic, saturated or unsaturated, and aliphatic or aromatic. Furthermore, although the hydrocarbon may include a functional group such as an alcohol group, an ether group, an ester group, and a carbonyl group, it may be preferable that the hydrocarbon does not include the functional group in term of reactivity with a resin which may be a material of the inner resin layer, reactivity with the foaming agent, and reactivity with a generated gas.

Specifically, for example, the isocyanate-based compound may be benzylisocyanate, phenylisocyanate, isoprene diisocyanate (IPDI), methylene diphenyl diisocyanate (MDI), toluene diisocyanate (TDI), or a combination thereof, but these examples do not exclude applicability of other isocyanate compounds.

The polyol-based compound may be at least any one selected from the group consisting of polyester polyol compounds and polyether polyol compounds.

The polyether polyol-based compound may be, for example, polytetramethylene ether glycol (PTMG) or the like.

The isocyanate-based compound and the polyol-based compound may be used as being properly mixed considering equivalence ratio used in a urethane reaction. Although the mixing ratio is not particularly limited, unless either of the compounds is used in excess, for example, 80% or more, a protective layer including urethane-based foam may be formed by properly controlling a gas evolution reaction between the foaming agent and the isocyanate-based compound and a urethane formation reaction between the isocyanate-based compound and the polyol compound.

The urethane-based foam may include a urethane-based polymer such as polyurethane, and may be formed by means of gas bubbles generated in a compound such as polyurethane by the gas evolution reaction which takes place together with the urethane reaction. This urethane-based foam may include polyether-based foam and polyester-based foam, the polyester-based foam is rigid foam having excellent heat resistance and solvent resistance and may prevent short circuit caused by external impact, and the polyether-based foam has excellent elasticity, so that properly mixed foam may be preferable in terms of short circuit prevention from impact by external factors or battery operation.

Figure 3:
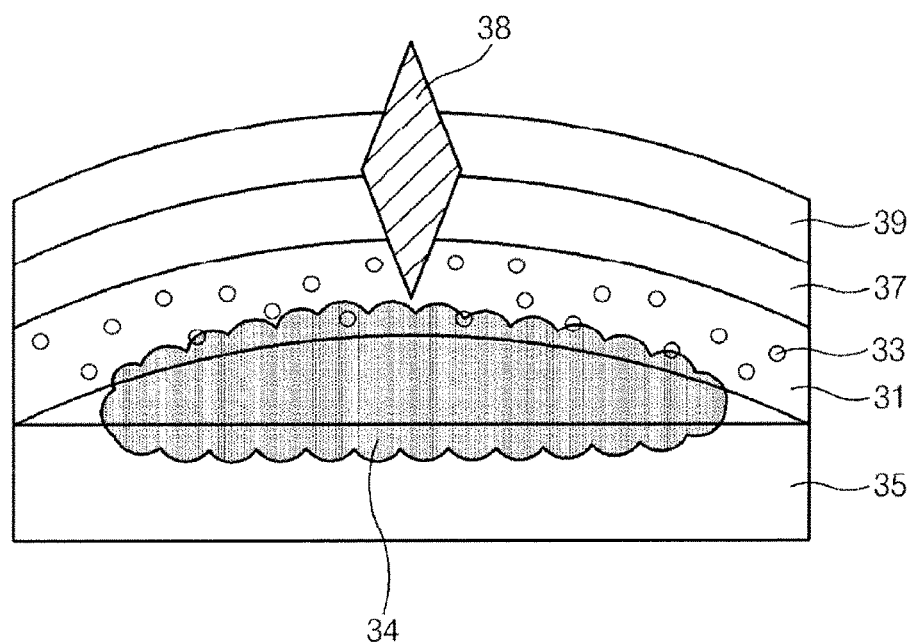
FIG. 3 is a sectional view illustrating that a protective layer is formed, due to an external factor, in a pouch case having layers of inner resin layer/metallic layer/outer resin layer wherein the inner resin layer includes a foaming activator according to an embodiment of the present disclosure.

FIG. 3 illustrates that a protective layer 34 including urethane-based foam is formed between an electrode assembly 35 and an inner resin layer 31 when impact is applied to a battery due to an external factor 38 and a crack is thus generated in a pouch case.

As illustrated in FIG. 3, the foaming agent such as water, carbon dioxide, or nitrogen, which reacts with a foaming activator 33, may be introduced due to the external factor 38. In this case, by a urethane reaction, a gas evolution reaction of the isocyanate compound, and the like, the foaming activator 33 may react with the foaming agent to form urethane foam. Accordingly, a metallic layer 37 and an outer resin layer 39 as well as the inner resin layer 31 may be bent like a bow due to volume expansion caused by internal gas generation, and the generated gas may thus form a protective layer 34 between the inner resin layer 31 and the electrode assembly 35.

In the case where the foaming agent is introduced due to the external factor 38, the external factor 38 means a needlelike object, a blunt object, or the like, and the introduction of the foaming agent may mean the case where a crack or hole is generated in the pouch case under strong impact by such an object such that the internal electrode assembly may be damaged.

Thus, the protective layer 34 may be formed in a space between the inner resin layer 31 and the electrode assembly 35 in contact with the inner resin layer 31, and urethane-based foam may be partially formed even in the outer resin layer because the foaming activator 33 is also included in the outer resin layer 39.

Due to the protective layer 34 including the urethane-based foam, the inner resin layer 31, the metallic layer 37, and the outer resin layer 39 may be formed in such an arcuate shape that the central portions thereof are more expanded than both ends thereof. Such a protective layer 34 may act as a sealer like the inner resin layer 31, and the formation of the protective layer 34 prevents moisture permeation into the electrode assembly 35, separator cracking, or the like which is caused by the external factor, and may thus prevent the risk such as explosion caused by a short circuit or the like by contact between the pouch case and the electrode assembly 35.

The foaming activator may be, but is not limited to, in the form of nearly spherical particles. When the foaming activator is in the form of nearly spherical particles, the particle diameter thereof may be about 60 µm or less.

In selecting the particle size of the foaming activator with respect to the thickness of the two resin layers, it may be preferable that the particle size is not greater than about 50% of the thickness of the inner resin layer and/or the outer resin layer, and it may be necessary to properly control the particle size according to the thickness of the two resin layers.

When the particle diameter of the foaming activator is greater than about 50% of the two resin layers, the particle size is excessive compared with the thickness of the resin layers, so that there is possibility to interfere with the sealing role of the inner resin layer in the absence of external impact, and when the foaming activator is excessively formed in the outer resin layer, there is possibility to reduce bending properties because urethane foam is rigid.

Furthermore, it is preferable that the foaming activator is homogeneously dispersed in the inner resin layer and/or the outer resin layer. Since the foaming activator may react with a small amount of moisture, there is no critical problem even if the foaming activator is not homogeneously dispersed. However, in order to serve to prevent moisture permeation by forming a protective layer in a short time, it may be preferable that the foaming activator is homogeneously dispersed throughout the resin layer.

Also, the content of the foaming activator may be about 30 vol % or less of the total volume of each of the inner resin layer and/or the outer resin layer. As in the particle size, it is necessary to properly control the amount of the foaming activator with respect to the volume of the inner resin layer.

The inner resin layer may have a thickness of 40 to 120 µm. The inner resin layer may be made of, for example, any one selected from the group consisting of polypropylene, casted polypropylene, a polypropylene-butylene-ethylene ternary copolymer, polypropylene chloride, polyethylene, an ethylene-propylene copolymer, a polyethylene-acrylate copolymer, a polypropylene-acrylate copolymer, and a combination thereof.

The metallic layer may have a thickness of 20 to 100 µm. The metallic layer may be made of, for example, an alloy of iron (Fe), carbon (C), chromium (Cr), and manganese (Mn), an alloy of iron (Fe), carbon (C), chromium (Cr), and nickel (Ni), or aluminum (Al). It may be preferable that aluminum is used as the metallic layer.

The outer resin layer may have a thickness of 10 to 100 µm. The outer resin layer may include, for example, a single layer of one, or a multi-layer of two or more, selected from the group consisting of polyethylene, polypropylene, polyethylene terephthalate, nylon, low density polyethylene (LDPE), high density polyethylene (HDPE), and linear low density polyethylene (LLDPE).

As described above, the pouch case of the present disclosure includes the isocyanate-based compound and the polyol-based compound in the inner resin layer thereof. Therefore, when the foaming agent such as water caused by an external factor is introduced, the protective layer including urethane-based foam is formed between the inner resin layer and the electrode assembly in a short time, so that the pouch case and the electrode assembly may be protected, moisture which is permeable into the electrode assembly may be blocked, and separator cracking also may be prevented.

Accordingly, explosion which may be caused by moisture permeation, separator cracking, or a short circuit by contact between the pouch case and the electrode assembly, or the like, may be prevented, and stability of a pouch type secondary battery may thus be ensured.

Furthermore, the present disclosure provides a pouch type secondary battery including an electrode assembly, and the pouch case of the present disclosure, which receives the electrode assembly.

In this case, the assembly is configured in such a way that a negative electrode including a negative electrode active material and a positive electrode including a positive electrode active material are insulated with each other and coiled, with a separator disposed therebetween.

Specifically, the positive electrode is prepared in such a way that a positive electrode collector is coated with a mixture of the positive electrode active material, a conducting agent, and a binder, and then dried. A filler may be added to the mixture if necessary.

The positive electrode active material according to the present disclosure may be used as being mixed with a compound mainly including a lithium intercalation material such as a layered compound such as a lithiated cobalt oxide ($LiCoO_2$) or a lithiated nickel oxide ($LiNiO_2$), which is substituted with one or more transition metals; a lithiated manganese oxide ($LiMnO_2$) of which chemical formula is expressed by $Li_{1+x}Mn_{2-x}O_4$ (where, $0 \leq x \leq 0.33$), $LiMnO_3$, $LiMn_2O_3$, or $LiMnO_2$; a lithiated copper oxide ($Li_2CuO_2$); a vanadium oxide such as $LiV_3O_8$, $LiFe_3O_4$, $V_2O_5$, or $Cu_2V_2O_7$; a lithiated nickel oxide of which chemical formula is expressed by $LiNi_{1-x}M_xO_2$ (where, M is Co, Mn, Al, Cu, Fe, Mg, B, or Ga, and $0.01 \leq x \leq 0.3$); a lithiated manganese composite oxide of which chemical formula is expressed by $LiMn_{2-x}M_xO_2$ (where, M is Co, Ni, Fe, Cr, Zn, or Ta, and $0.01 \leq x \leq 0.1$) or $Li_2Mn_3MO_8$ (where, M is Fe, Co, Ni, Cu, or Zn); a $LiMn_2O_4$ in which lithium is partially substituted with alkaline earth metal ions; a disulfide compound; $Fe_2(MoO_4)_3$ or a composite oxide formed by a combination thereof.

The positive electrode collector is generally prepared to have a thickness of 3 to 500 μm. The positive electrode collector is not particularly limited as long as it has a high conductivity without causing any chemical change in the battery. For example, stainless steel, aluminum, nickel, titanium, baked carbon, or aluminum or stainless steel which is surface-treated with carbon, nickel, titanium, silver, or the like may be used as the positive electrode collector. The collector may form fine irregularities on the surface thereof, which may enhance adhesion to the positive electrode active material, and may be in a variety of forms such as films, sheets, foils, nets, porous bodies, foams, and non-woven fabrics.

The conducting agent is generally added up to 1 to 50 wt % based on the total weight of the mixture including the positive electrode active material. The conducting agent is not particularly limited as long as it has conductivity without causing any chemical change in the battery. For example, graphite such as natural graphite or artificial graphite; carbon black such as carbon black, acetylene black, ketjenblack, channel black, furnace black, lamp black, or thermoblack; conductive fibers such as carbon fibers or metal fibers; metal powder such as fluorocarbon, aluminum, and nickel powder; conductive whisker such as zinc oxide or potassium titanate; conductive metal oxide such as titanium oxide; conductive materials such as polyphenylene derivatives may be used as the conducting agent.

The binder is a component for assisting in binding between the active material and the conducting agent etc. and in binding to the collector, and is generally added up to 1 to 50 wt % based on the total weight of the mixture including the positive electrode active material. Examples of the binder may include polyvinylidenefluoride, polyvinylalcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymers (EPDM), sulfonated EPDM, styrene-butylene rubbers, fluororubbers, and a variety of copolymers.

The filler is an optional component for preventing swelling of the positive electrode, and is not particularly limited as long as it is a fibrous material which does not cause any chemical change in the battery. For example, olefin polymers such as polyethylene or polypropylene, and fibrous materials such as glass fibers or carbon fibers are used as the filler.

Furthermore, the negative electrode is prepared in such a way that a negative electrode collector is coated with a negative electrode material and then dried. If necessary, the aforesaid components may be further included therein.

The negative electrode collector is generally prepared to have a thickness of 3 to 500 μm. The negative electrode collector is not particularly limited as long as it has conductivity without causing any chemical change in the battery. For example, copper, stainless steel, aluminum, nickel, titanium, baked carbon, copper or stainless steel which is surface-treated with carbon, nickel, titanium, silver, or the like, or aluminum-cadmium alloys may be used as the negative electrode collector. Also, as in the positive electrode collector, the negative electrode collector may form fine irregularities on the surface thereof, which may enhance adhesion to the negative electrode active material, and may be used in a variety of forms such as films, sheets, foils, nets, porous bodies, foams, and non-woven fabrics.

The negative material includes amorphous carbon or crystalline carbon, and specifically, carbon such as hard carbon or graphite carbon; a metallic composite oxide such as $Li_xFe_2O_3$ ($0 \leq x \leq 1$), $Li_xWO_2$ ($0 \leq x \leq 1$), or $Sn_xMe_{1-x}Me'_yO_z$ (Me is Mn, Fe, Pb, or Ge; Me' is Al, B, P, Si, Group I, Group II, or Group III element in the periodic table, or halogen; $0 \leq x \leq 1$; $1 \leq y \leq 3$; and $1 \leq z \leq 8$; a lithium metal; a lithium alloy; a silicon alloy; a tin alloy; an oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer such as polyacetylene; or a Li—Co—Ni based material may be used as the negative material.

The separator which is disposed between the positive electrode and the negative electrode and insulates the electrodes, may be, but is not limited to, a generally known polyolefin-based separator, a composite separator in which an organic-inorganic composite layer is formed on an olefin-based substrate, or the like.

The electrode collector having the aforesaid structure is stored in the pouch case, and then an electrolytic solution is injected thereto to prepare a battery.

The electrolytic solution according to the present disclosure is a non-aqueous electrolyte containing a lithium salt, which consists of a non-aqueous electrolyte and lithium. Examples of the non-aqueous electrolyte include non-aqueous electrolytic solutions, organic solid electrolytes, and inorganic solid electrolytes.

Examples of the non-aqueous electrolytic solution may include aprotic solvents such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydroxyfuran, 2-methyl tetrahydrofuran, dimethyl sulfoxide, 1,3-dioxolan, formamide, dimethylformamide, dioxolan, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphate ester polymers, poly agitation lysine, polyester sulfides, polyvinyl alcohol, polyvinylidene difluorides, and polymers including ionic dissociable groups.

Examples of the inorganic solid electrolyte may include lithium nitrides, lithium halides, and lithium sulfates, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material which is readily soluble in the non-aqueous electrolyte. For example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, low-molecular weight aliphatic lithium carboxylate, 4-phenyl lithium borate, or imide may be used as the lithium salt.

Furthermore, in order to improve charge/discharge characteristics, fire retardant properties, and the like, for example, pyridine, triethylphosphite, triethanolamine, cyclic ether, ethylene diamine, n-glyme, hexaphosphate triamide, a nitrobenzene derivative, sulfur, quinoneimine dye, N-substituted oxazolidinone, N,N-substituted imidazolidine, ethylene glycol dialkyl ether, an ammonium salt, pyrrole, 2-methoxy ethanol, or aluminum trichloride may be added to the non-aqueous electrolyte. As applicable, a halogen-containing solvent such as carbon tetrachloride and trifluoro ethylene may be further included to impart nonflammability, and carbon dioxide gas may be further included to improve high temperature storage characteristics.

Meanwhile, the aforesaid pouch type secondary battery is preferably, but not limited to, a lithium secondary battery.

EXAMPLE

Hereinafter, preferred embodiments of the present disclosure will be described in detail with reference to the accompanying drawings so that those skilled in the art may easily carry out the present disclosure. The present disclosure may, however, be embodied in many different forms and should not be construed as limited to the embodiments set forth herein.

Example 1

1) Preparation Of Electrode Assembly

According to a conventional method used in the art, ternary lithium composite metal oxide ($LiMn_{1/3}CO_{1/3}Ni_{1/3}O_2$) was used as a positive electrode active material, and the active material was applied onto an aluminum collector to prepare a positive electrode. Artificial graphite was used as a negative electrode active material, and the active material was applied onto a copper collector to prepare a negative electrode. Thereafter, a polyolefin-based separator was disposed between the negative electrode and the positive electrode, and then a non-aqueous electrolytic solution was injected thereto to prepare an electrode assembly.

2) Preparation Of Pouch Type Secondary Battery

A polypropylene resin was used as an inner resin layer, a nylon resin was used as an outer resin layer, and aluminum was used as a metallic layer. Benzylisocyanate and polyester polyol in the form of capsules (about 50 μm) were added as a foaming activator in the inner resin layer and the outer resin layer, and the inner resin layer, the metallic layer, and the outer resin layer were stacked in that order to prepare a pouch case. In this case, the volume of the foaming activator capsules included in each of the inner resin layer and the outer resin layer was about 25 vol % based on the total volume of the each resin layer.

Figure 5:
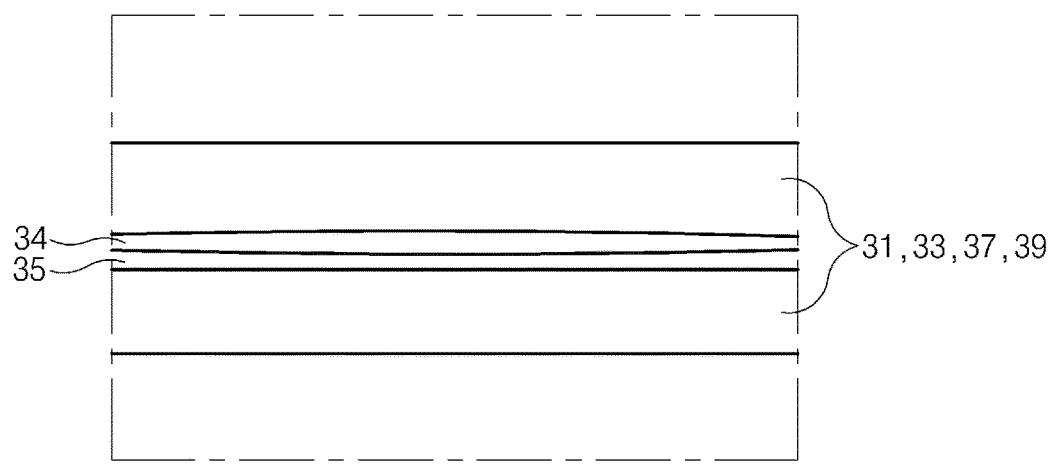
FIG. 5 shows a pouch type secondary battery in which a protective layer is formed by foaming according to an embodiment of the present disclosure.

The electrode assembly was placed in the prepared pouch case, and then the pouch case was sealed through heat fusion. In order to confirm that a protective layer of polyester-based urethane foam was formed by foaming with the foaming activator, before the sealing, a cross section in a state that the protective layer was formed and the electrode assembly and the pouch case were stacked was photographed and shown in FIG. 5.

Comparative Example 1

Figure 6:
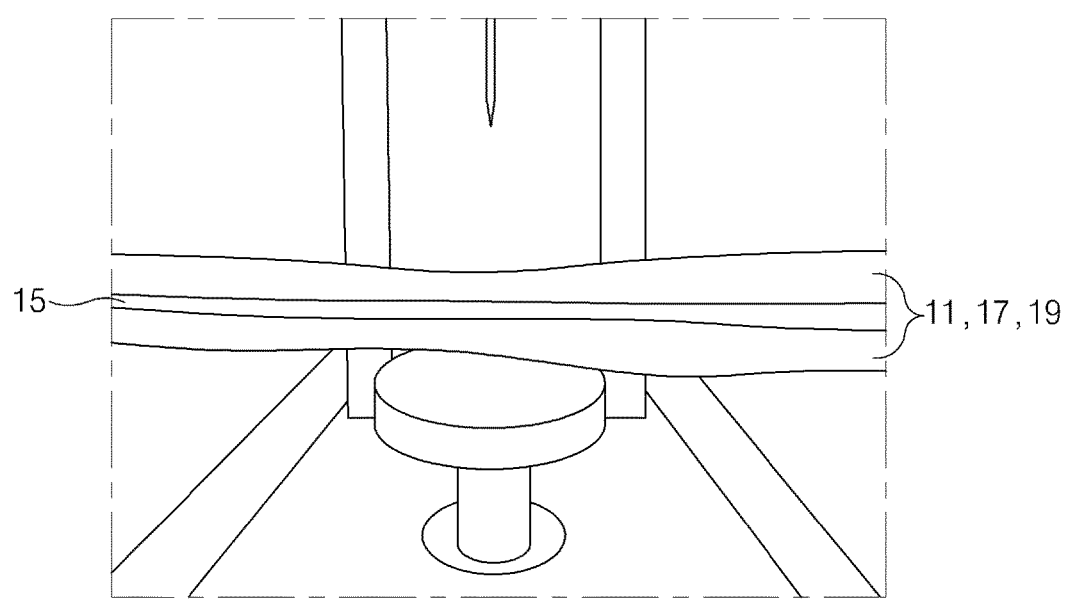
FIG. 6 shows a conventional pouch type secondary battery without a protective layer.

A pouch type secondary battery was prepared using the same materials and the same method as in Example 1 except that the foaming activator for forming the protective layer was not added to the inner resin layer and the outer resin layer of the pouch case. Also in this case, before the sealing, a cross section in a state that the electrode assembly and the pouch case were stacked was photographed and shown in FIG. 6.

Experimental Example

Rupture Test of Pouch Type Secondary Battery

Figure 4:
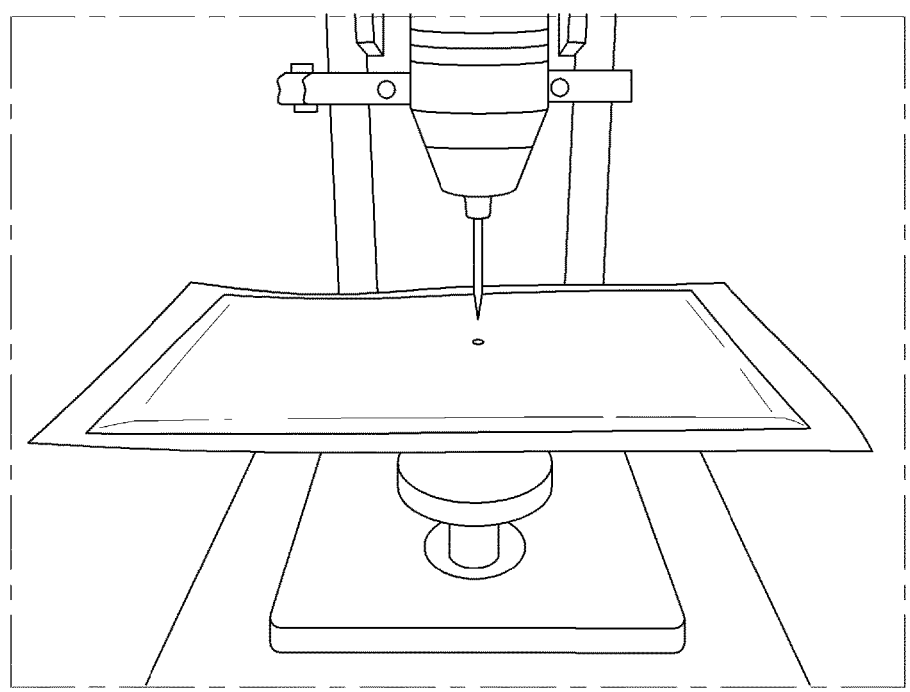
FIG. 4 shows an apparatus for a rupture test of a pouch type secondary battery under an external factor.
Figure 7:
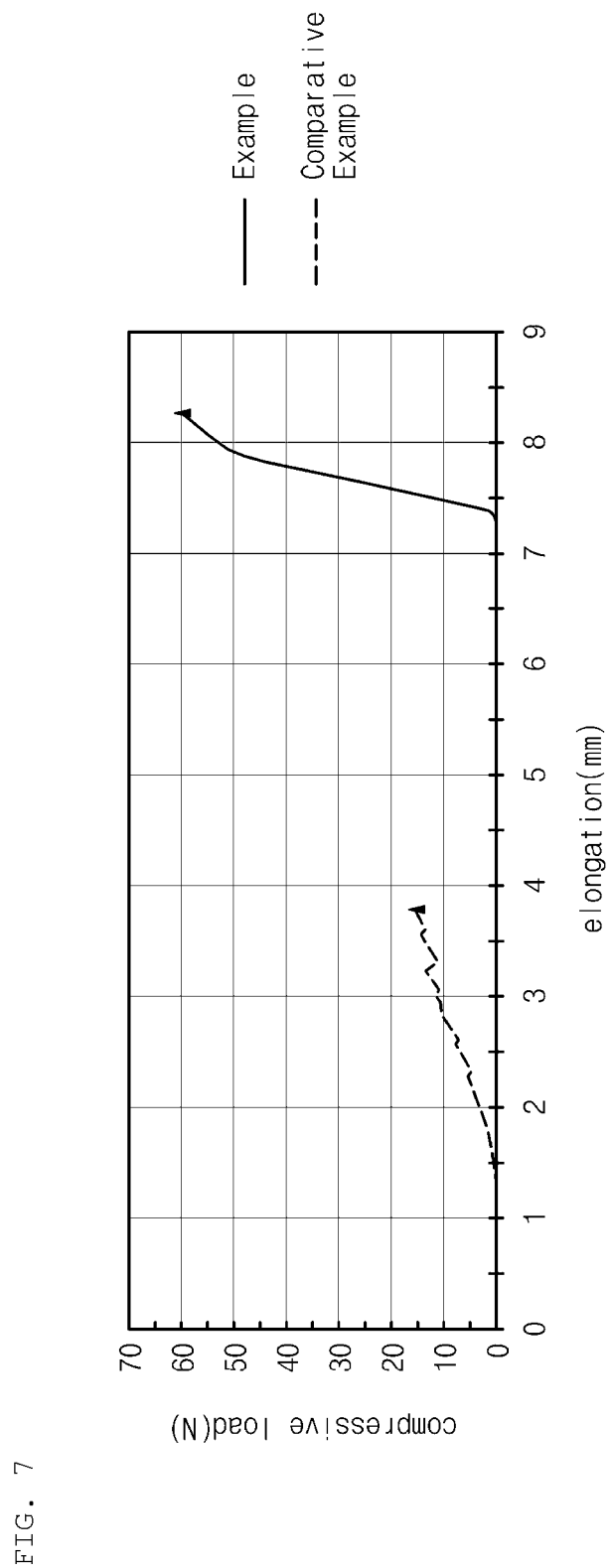
FIG. 7 is a graph showing results of rupture tests of pouch type secondary batteries.

In order to compare rupture point and magnitude of force that must be applied for rupture with respect to pouch type secondary batteries of the Example 1 and Comparative Example 1, rupture tests were performed using the pin of UTM apparatus in FIG. 4, and the results were shown in Table 1 and FIG. 7.

TABLE 1

| | Maximum compressive load (kgf) | Rupture at compressive load (N) | Puncture (N/μm) |
|---|---|---|---|
| Example 1 | 6.1297 | 60.1121 | 0.0601 |
| Comparative Example 1 | 1.5863 | 15.5563 | 0.0156 |

Referring to Table 1 and FIG. 7, it could be seen that in the case of the pouch type secondary battery in Comparative Example 1, in which the protective layer was not formed, the internal electrode assembly was ruptured when force of about 1.59 kgf was applied thereto, and maximum external impact against rupture was about 15 N, but in the case of the pouch type secondary battery in Example 1, in which the protective layer was formed, the internal electrode assembly was not ruptured until force of about 6.13 kgf was applied thereto, and maximum external impact against rupture was about 60 N.

That is, the secondary battery in Example 1 was different in force by external impact, against which the internal electrode assembly could be protected, by about four times from the secondary battery in Comparative Example 1, and it could be seen that the pouch type secondary battery in Example 1 can protect the internal electrode assembly against even quadruple impact compared with the pouch type secondary battery in Comparative Example 1.

The pouch case of the present disclosure includes the isocyanate-based compound and the polyol-based compound in the inner resin layer thereof. Therefore, when the foaming agent such as water caused by an external factor is introduced, the protective layer including urethane-based foam is formed between the inner resin layer and the electrode assembly in a short time, so that the pouch case and the electrode assembly may be protected, moisture which is permeable into the electrode assembly may be blocked, and separator cracking also may be prevented.

Accordingly, explosion which may be caused by moisture permeation, separator cracking, or a short circuit by contact between the pouch case and the electrode assembly, or the like, may be prevented, and stability of a pouch type secondary battery may thus be ensured.

While the present disclosure has been shown and described in connection with the exemplary embodiments, it will be apparent to those skilled in the art that modifications and variations can be made without departing from the spirit and scope of the invention as defined by the appended claims.

What is claimed is:

1. A pouch case for a secondary battery, comprising an inner resin layer, a metallic layer, and an outer resin layer,
wherein at least one resin layer of the inner resin layer and the outer resin layer comprises a foaming activator containing an isocyanate-based compound and a polyol compound,
wherein the foaming activator is in a form of spherical particles having a particle diameter of 60 µm or less, and
wherein, when a foaming agent is introduced by an external factor caused by a crack or a rupture, a protective layer comprising urethane-based foam is formed, on an outer surface of the inner resin layer, by a urethane-based foaming reaction among the isocyanate-based foaming activator, the polyol-based foaming activator, and said foaming agent.

2. The pouch case of claim 1, wherein
the particle diameter of the foaming activator included in the inner resin layer is 50% or less of the thickness of the inner resin layer, and
the particle diameter of the foaming activator included in the outer resin layer is 50% or less of the thickness of the outer resin layer.

3. The pouch case of claim 1, wherein
the content of the foaming activator included in the inner resin layer is 30 vol % or less of the total volume of the inner resin layer, and
the content of the foaming activator included in the outer resin layer is 30 vol % or less of the total volume of the outer resin layer.

4. The pouch case of claim 1, wherein the isocyanate-based foaming activator comprises any one selected from the group consisting of benzylisocyanate, phenylisocyanate, isoprene diisocyanate (IPDI), methylene diphenyl diisocyanate (MDI), toluene diisocyanate (TDI), and a combination thereof.

5. The pouch case of claim 1, wherein the polyol-based foaming activator is at least any one selected from the group consisting of polyester polyol compounds and polyether polyol compounds.

6. The pouch case of claim 5, wherein the polyether polyol-based compound comprises polytetramethylene ether glycol (PTMG).

7. The pouch case of claim 1, wherein the foaming agent is any one selected from the group consisting of water, carbon dioxide, nitrogen, and a combination thereof.

8. The pouch case of claim 1, wherein the inner resin layer is made of any one selected from the group consisting of casted polypropylene, a polypropylene-butylene-ethylene ternary copolymer, polypropylene chloride, polyethylene, an ethylene-propylene copolymer, a polyethylene-acrylate copolymer, a polypropylene-acrylate copolymer, and a combination thereof.

9. The pouch case of claim 1, wherein the inner resin layer has a thickness of 40 to 120 µm.

10. The pouch case of claim 1, wherein the metallic layer is made of any one selected from the group consisting of aluminum (Al); an alloy of iron (Fe), carbon (C), chromium (Cr), and manganese (Mn); and an alloy of iron (Fe), carbon (C), chromium (Cr), and nickel (Ni).

11. The pouch case of claim 1, wherein the metallic layer has a thickness of 20 to 100 µm.

12. The pouch case of claim 1, wherein the outer resin layer comprises a single layer of one, or a multi-layer of two or more, selected from the group consisting of polyethylene, polypropylene, polyethylene terephthalate, nylon, low density polyethylene (LDPE), high density polyethylene (HDPE), and linear low density polyethylene (LLDPE).

13. The pouch case of claim 1, wherein the outer resin layer has a thickness of 10 to 100 µm.

14. A pouch type secondary battery, comprising:
an electrode assembly comprising a positive electrode, a negative electrode, a separator, and an electrolyte; and
the pouch case of claim 1 receiving the electrode assembly.

15. A battery module comprising the pouch type secondary battery of claim 14 as a unit cell.

16. A middle or large device comprising the battery module of claim 15 as a power source.

17. The pouch type secondary battery of claim 14, wherein a protective layer is formed between the electrode assembly and the inner resin layer when impact is applied to the pouch type secondary battery due to an external factor.

18. The pouch case of claim 1, wherein the isocyanate-based foaming activator comprises any one selected from the group consisting of benzylisocyanate, phenylisocyanate, isoprene diisocyanate (IPDI), methylene diphenyl diisocyanate (MDI), and a combination thereof.

19. The pouch case of claim 1, wherein the foaming activator is homogenously dispersed in the inner resin layer and/or the outer resin layer.

* * * * *